May 10, 1938.  B. LONG  2,116,633
LIGHT FILTER
Filed Jan. 14, 1935

INVENTOR.
BERNARD LONG
BY Richards & Geier
ATTORNEYS

Patented May 10, 1938

2,116,633

UNITED STATES PATENT OFFICE 2,116,633

LIGHT FILTER

Bernard Long, Paris, France, assignor to Societe Anonyme Des Manufactures Des Glaces & Produits Chimiques De Saint-Gobain, Chauny & Cirey, Paris, France Application January 14, 1935, Serial No. 1,591
In France January 16, 1934

8 Claims. (Cl. 250—34)

This invention relates to light filters and refers more particularly to an apparatus used for observing images produced by X-rays on a fluorescent screen.

Fluorescent screens are used in X-ray diagnosis for the purpose of producing light radiations caused by invisible X-rays which pass through the body of a patient or the like. These screens consist usually of a fluorescent layer comprising cadmium tungstate, calcium tungstate or platinobarium cyanide.

It was found that when a fluorescent screen is caused to fluoresce under the influence of X-rays, it emits certain rays of light in addition to those permitting the observer to see an image, which diminish the clearness and the visibility of this image.

Another difficulty found in making observations by means of fluorescent screens, consists in that such observations usually have to be made in an entirely dark room since the visibility of images produced on fluorescent screens is further diminished by even weak rays of light emitted by the source which illuminates the observation room.

It has been proposed to eliminate these disadvantages by illuminating the room in which the observations are taking place by a source of light which emits light rays complementary to the light emitted by the fluorescent screen and by employing a filter which absorbs this complementary light. These attempts to improve the clearness of the images produced by the fluorescent screen have not been successful in practice, due to the difficulty of finding the proper source of complementary light and the proper filter for this source, with the result that, as a rule, observations of fluorescent screens continue to take place in entirely dark rooms.

An object of the present invention is the provision of a filter consisting of glass of such composition that it will absorb those light rays which disturb the clearness of the image produced by the fluorescent screen, whereby the clearness of these images is considerably improved.

Another object is the provision of simple and effective means permitting to carry out observations of fluorescent screens in a lighted room.

A further object is the provision of a glass filter of a certain specific composition, by means of which images produced by fluorescent screens can be easily and clearly observed in a room which is illuminated by a certain specific source of light.

The above and other objects of the present invention may be realized through the provision of a light filter consisting of glass which comprises neodyme oxide. When it is desired to illuminate the room in which the observations are taking place such glass filter, in accordance with the present invention, is used in combination with a light produced by a sodium vapor lamp. The light filter constructed in accordance with the present invention may be combined with a screen generally used to prevent the X-rays passing through the fluorescent screen from reaching the observer, by making such filter of glass which besides neodyme oxide, contains also lead oxide and barium oxide.

The invention will appear more clearly from the following detailed description when taken in connection with the accompanying drawing showing preferred embodiments of the inventive idea.

Figure 1:
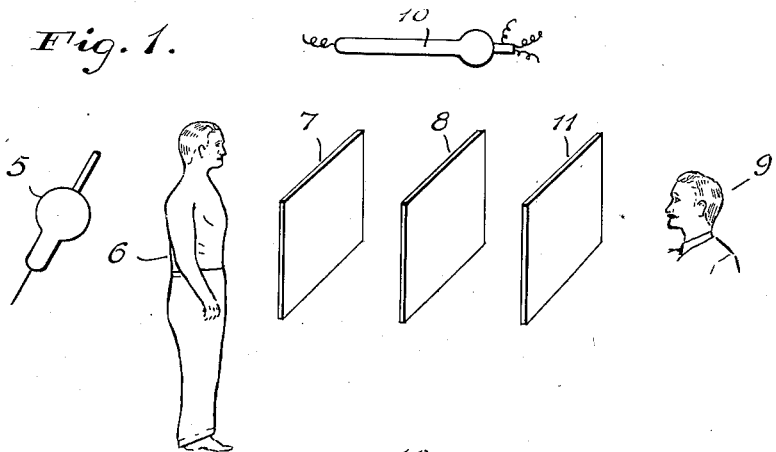
Figure 1 illustrates diagrammatically a device used for observing images produced on a fluorescent screen.

Fig. 1 shows an X-ray tube 5, which emits X-rays passing through the body 6 of a patient and through a fluorescent screen 7. A screen 8 for absorbing the X-rays is situated between the fluorescent screen 7 and the observer 9. The entire apparatus may be illuminated by a source of light 10.

In accordance with the present invention a light filter 11 which absorbs those rays of light which affect the visibility of the image produced on the fluorescent screen 7, is interposed between the observer 9 and the fluorescent screen 7. This glass filter 11 is preferably made of glass which comprises, in addition to the usual ingredients, neodyme oxide, which has the property of absorbing those rays of light which affect the visibility of images produced upon the fluorescent screen 7.

Neodyme oxide is preferably added to the raw glass batch and the amount added depends upon various operating conditions and upon the strength of light emitted by the fluorescent screen 7. For fluorescent layers comprising platinobarium cyanide, cadmium tungstate or calcium tungstate, the amount of neodyme oxide which is to be contained in the glass filter varies between 2% and 12%.

Figure 2:
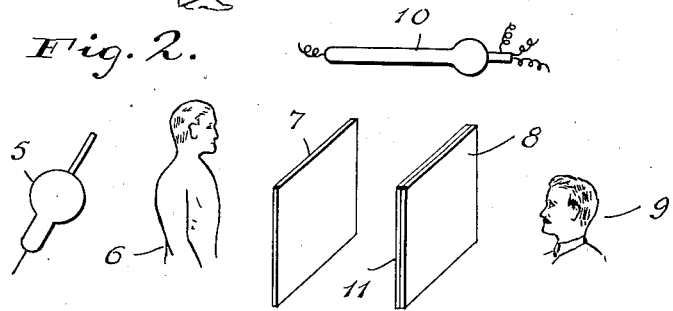
Figure 2 is a diagram illustrating a somewhat different construction.

In the apparatus shown in Fig. 1 of the drawing the screen 8 absorbing the X-rays is situated between the fluorescent screen 7 and the glass filter 11. Obviously, the screen 8 may be placed between the filter 11 and the observer 9 and may be combined with this filter, as shown in Figure 2 of the drawing.

Figure 3:
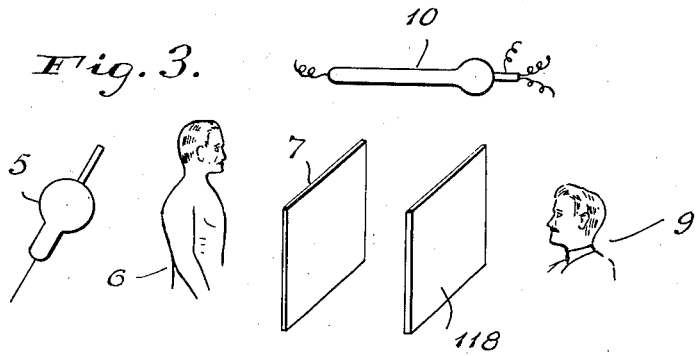
Figure 3 shows diagrammatically another modification of the inventive idea.

The glass plate 118 shown in Fig. 3 is used not only as a glass filter, but also as a screen absorbing the X-rays. In order to perform this double function the glass plate 118 is made of a glass which besides comprising neodyme oxide, comprises also lead oxides and barium oxide. These ingredients are added to the raw glass batch. It has been found that very good glass is produced if the following proportions of the above-mentioned ingredients are used:

| | Percent |
|---|---|
| PbO | 47 |
| BaO | 15 |
| Nd$_2$O$_3$ | 5 |

In accordance with the present invention, the glass filter 11 containing neodyme oxide, or the glass filter 118 containing neodyme oxide and lead oxide and barium oxide, may be used in combination with a sodium vapor lamp 10, illuminating the chamber in which the observations are taking place by light rays, which will be intercepted practically entirely by the filter 11 or the filter 118. Practical experiments have shown that the light rays emitted by a sodium vapor lamp are intercepted practically completely by a glass filter containing neodyme oxide.

If a sodium vapor lamp 10 is used for the purpose of illuminating the observation room, the light emitted by this lamp will not affect or diminish the clearness of the image, seen by the observer 9 through the glass filter 11. Due to the provision of this lamp the observation room can be clearly illuminated while the observations are being taken, and at the same time the image upon the fluorescent screen will remain clearly visible. Obviously, to achieve this result it is necessary to use both elements together, namely, the sodium vapor lamp 10, as well as the glass filter 11 or 118 containing neodyme oxide.

On the other hand, the filter 11 containing neodyme oxide, or the filter 118 containing neodyme oxide, lead oxide and barium oxide may be used in an entirely dark room. If these filters are used in a room illuminated by a different source of light than the sodium vapor lamp 10, the visibility of the images produced upon the fluorescent screen 7 will be diminished, although these images will be observed much more clearly than if they were observed in the absence of the filter 11, or the filter 118.

What is claimed is:

1. In combination, an X-ray tube, a fluorescent screen adapted to emit visible light rays when influenced by X-rays emitted by said X-ray tube, and a filter consisting of glass containing neodyme oxide with the addition of lead oxide and barium oxide, said filter being interposed between said screen and the observer, whereby the visibility of the image produced on said fluorescent screen is increased and the X-rays emitted by said X-ray tube are absorbed.

2. In combination, an X-ray tube, a fluorescent screen adapted to emit visible light rays when influenced by X-rays emitted by said X-ray tube, a filter consisting of glass containing neodyme oxide, said filter being interposed between said screen and the observer, whereby the visibility of the image produced on said fluorescent screen is increased, and a source of light consisting of a sodium vapor lamp illuminating the space adjacent said fluorescent screen during the observation of the image produced upon said fluorescent screen.

3. In combination, an X-ray tube, a fluorescent screen adapted to emit visible light rays when influenced by X-rays emitted by said X-ray tube, a filter consisting of glass containing neodyme oxide, lead oxide and barium oxide, said filter being interposed between said screen and the observer, whereby the visibility of the image produced on said fluorescent screen is increased, and to absorb X-rays emitted by said X-ray tube, and a source of light consisting of a sodium vapor lamp illuminating the space adjacent said fluorescent screen during the observation of the image produced upon said fluorescent screen.

4. The combination of a fluorescent screen adapted to emit visible light rays when influenced by X-rays, with means interposed between an observer and said fluorescent screen and absorbing said X-rays and a part of the light rays emitted by said fluorescent screen, said means comprising glass containing neodyme oxide, whereby the visibility of the image produced on said fluorescent screen is increased.

5. In combination, an X-ray tube, a fluorescent screen adapted to emit visible light rays when influenced by X-rays emitted by said X-ray tube, an X-ray filter comprising glass containing lead oxide and barium oxide, and another filter comprising glass containing neodyme oxide, the second-mentioned filter being interposed between the first-mentioned filter and the observer, whereby the visibility of an image produced upon said fluorescent screen is increased and the X-rays emitted by said X-ray tube are absorbed.

6. In combination, an X-ray tube, a fluorescent screen adapted to emit visible light rays when influenced by X-rays emitted by said X-ray tube, a filter comprising glass containing neodyme oxide, and another filter comprising glass containing lead oxide and barium oxide, the second-mentioned filter being interposed between the first-mentioned filter and the observer, whereby the visibility of an image produced upon said fluorescent screen is increased and the X-rays emitted by said X-ray tube are absorbed.

7. In combination, an X-ray tube, a fluorescent screen adapted to emit visible light rays when influenced by X-rays emitted by said X-ray tube, an X-ray filter comprising glass containing lead oxide and barium oxide, another filter comprising glass containing neodyme oxide, the second-mentioned filter being interposed between the first-mentioned filter and the observer, and a source of light consisting of a sodium vapor lamp and illuminating the space adjacent said fluorescent screen during the observation of the image produced upon said fluorescent screen, whereby the visibility of an image produced upon said fluorescent screen is increased and the X-rays emitted by said X-ray tube are absorbed.

8. In combination, an X-ray tube, a fluorescent screen adapted to emit visible light rays when influenced by X-rays emitted by said X-ray tube, a filter comprising glass containing neodyme oxide, another filter comprising glass containing lead oxide and barium oxide, the second-mentioned filter being interposed between the first-mentioned filter and the observer, and a source of light consisting of a sodium vapor lamp and illuminating the space adjacent said fluorescent screen during the observation of the image produced upon said fluorescent screen, whereby the visibility of an image produced upon said fluorescent screen is increased and the X-rays emitted by said X-ray tube are absorbed.

BERNARD LONG.